M. D., & T. A. CONNOLLY & T. J. McTIGHE.
Automatic Telephone-Exchange.

No. 222,458. Patented Dec. 9, 1879.

WITNESSES:
Saml. J. VanStavoren
Anthony Connolly

INVENTORS
M. Daul Connolly
Thos. A. Connolly
Thos. J. McTighe
By Connolly Bro.
ATTORNEYS M. D., & T. A. CONNOLLY & T. J. McTIGHE.
Automatic Telephone-Exchange.
No. 222,458. Patented Dec. 9, 1879.

WITNESSES:
Saml. J. Van Stavoren
Anthony Connolly

INVENTORS,
M. D. Connolly
T. A. Connolly
Thos. J. McTighe
By Connolly Bros.
ATTORNEYS M. D., & T. A. CONNOLLY & T. J. McTIGHE.
Automatic Telephone-Exchange.
No. 222,458. Patented Dec. 9, 1879.

UNITED STATES PATENT OFFICE.

M. DANIEL CONNOLLY, OF PHILADELPHIA, PENNSYLVANIA, THOMAS A. CONNOLLY, OF WASHINGTON, DISTRICT OF COLUMBIA, AND THOMAS J. McTIGHE, OF PITTSBURG, PENNSYLVANIA.

IMPROVEMENT IN AUTOMATIC TELEPHONE-EXCHANGES.

Specification forming part of Letters Patent No. 222,458, dated December 9, 1879; application filed September 10, 1879.

*To all whom it may concern:*

Be it known that we, M. DANIEL CONNOLLY, of Philadelphia, in the county of Philadelphia, State of Pennsylvania, THOMAS A. CONNOLLY, of Washington, District of Columbia, and THOMAS J. McTIGHE, of Pittsburg, in the county of Allegheny, and State of Pennsylvania, have jointly invented a certain new and useful Automatic Telephone-Exchange; and we do hereby declare the following to be a full, clear, and exact description of the invention, such as will enable others skilled in the art to which it pertains to make and use it, reference being had to the accompanying drawings, which form part of this specification, in which—

The object of our invention is to provide what may be termed an "automatic telephonic exchange," in which each station of the exchange is in communication with a main or principal station, through which connections are established between any two of the individual stations.

Under the present system in use in the principal cities having telephonic facilities the lines from the several stations converge to a central office and terminate in a switch-board. When any individual member of the exchange desires to communicate with any other member he signals the central office, states his desires, and an attendant thereupon makes the desired connection. The operation of making these connections is now altogether a manual work, and requires not only constant attention but much dexterity in order that there shall be as little delay as possible; but in exchanges comprising many members the work of the central office is very great, requiring many employés to meet the wants of the community. Even then there are incessant delays, much confusion, and consequently many mistakes and annoyances which it is highly important should be obviated.

Our present invention contemplates the employment, in lieu of manual labor and the necessary skill and intelligence to apply it, of the capabilities of electricity and electro-magnetism, whereby all the difficulties now met with are entirely overcome, and the operation of the central office rendered completely automatic, rapid, and reliable. Each or any member of the exchange may, by means of local contrivances having electrical communication with the central office, place himself in communication with any other member whose line happens to be unoccupied. At the same time he is enabled to entirely isolate his own and the line he desires to communicate with from all others of the exchange, so that no interferences or interruptions can possibly occur. He is also enabled to signal the member to be communicated with, and in fact to place his own and the other line into the most desirable and convenient relation to each other and to the balance of the exchange as the most urgent demands of the telephonic-exchange system require.

The details of our automatic exchange system have reference to the stations and to the central office. In accordance with our plan each station comprises, in addition to the usual battery and any preferable style of telephone, a reversing-key, a signal or call bell, a compound switch, and a dial instrument. The function of the latter is to make intermittent breaks in the electric current, the number and character of which are successively indicated on the dial by means of a pointer, and to thereby produce a responsive action of the mechanism at the central station pertaining to the given line, which action results in or is followed by the establishment of the required connection and correlative arrangement of parts necesssary to an intercommunication of the two lines. After contact or connection with the proper line is made at the central the current is reversed, and such reversal instantly brings into action mechanism at the central office, dependent absolutely thereon, which at once isolates the connected lines; at the same moment the signal of the station to be called is rung. At the station thus signaling, main is then switched from the battery to the call-bell. The signaled station now shunts his battery into main line and sends a similar reversed current, which actuates the bell of signaling-station. The stations now in communication switch their lines to their respective telephones, cutting out both bells and batteries from main line, and conversation may then be carried on.

The operations, then, at the signaling-station are, in brief, first, the manipulation of the dial instrument while current is normal; second, reversal of the current; third, shunting of the main line first to call-bell, and then to telephone. These are simple operations, requiring no skill, and may be all performed successively within the period of a moment or two. After communication has terminated the parts are to be restored to their normal condition— i. e., each station must have its main line in connection with its signal-branch, and the parts at the central office adjusted to the proper position for connection with any other lines of the system.

In practice we have reduced the system of signaling and automatically-determined intercommunication above set out to the organization of devices which we shall now proceed to explain.

First, as to the local stations. At each local station the main line enters through the medium of a switch-connection, (indicated by letter A,) and adapted to bring into circuit severally the dial instrument A', call-bell A², and telephone A³, as well as to switch the battery locally into primary of telephone.

Any form or style of telephone may be used; but we have preferably shown that in which the electric pulsations transmitted are generated inductively in a secondary coil from a primary in the circuit of a local battery, A⁴.

The dial instrument may be of the kind usually employed as transmitters or senders in the ordinary dial-system of electro-telegraphy.

Upon the face of the dial are indicated the numbers or letters of the different stations in the system. A pointer, $a$, has its axis in the center of the dial, and turns with a break-wheel, $a'$, which makes and breaks the circuit as it is rotated with regular intermissions. The wheel $a'$ is in the circuit, and its toothed periphery contacts with a spring or finger, $a^2$, also in the circuit, the circuit being broken at the passage of each tooth. These teeth correspond in number and position with the numbers or letters on the dial, so that when the pointer coincides with, say, 100 on the dial, it indicates that one hundred teeth have passed the spring and a like number of breaks have been made. This is to be understood as merely a suggestion as to the means of breaking the circuit and indicating the intermissions.

Any of the well-known forms of dial instruments adapted to the use required may be employed, and hence our invention is not limited to any particular one.

One of the wires from the dial instrument leads to the local battery, whose other pole leads to earth.

In a branch line at the local station is the call-bell A², and this is governed by a magnet, B', and armature B², which it is not necessary to particularly describe. The idea is that when this branch, which grounds after leaving the bell-magnet, is in circuit it will respond to a reversed current only, brought into requisition by the party signaling from a distant station and from his own battery.

The wires leading from the battery are controlled by a reversing-key, C, of any suitable construction. Its office is to reverse the direction of the electric current passing through the line by changing the relations of the poles of the battery to the main line and earth, respectively.

The local circuit required for the primary of the telephone is made and broken by the compound switch, which also controls the secondary, bringing the latter into the main circuit at the same time that the primary is closed. The terminals of the primary are $d$ $d'$, and of the secondary $d^2$. The switch is formed with an arm, $c$, and an insulated branch, $c'$, having at any suitable point a conducting-bar, $a^7$. By turning the switch on its pivot the several connections are made, as shown in the drawings.

In lieu of a single compound switch, two or more switches may be employed to perform the same service.

Second, as to the central office. Upon a single axis, E, are arranged as many ratchet-wheels E', superimposed or side by side, as there are stations, and to the use of each station is allotted one such ratchet, with its appurtenant parts, which is entirely under individual control. Attached to or in connection with each ratchet-wheel is a pointer, E², which travels with the ratchet. The ratchet has teeth corresponding in number with the teeth of the break-wheel at the local stations, and is turned on its axis by means of a dog or equivalent, actuated by the armature of an electro-magnet, F, in the main circuit.

The movement of the ratchet is intermittent and in response to the intermittent impulses of the electric current determined by the dial instrument, and the movement of the pointer corresponds—that is to say, the ratchet at central office is revolved tooth by tooth exactly in accordance with and by the operation of the dial-rheotome at the local station with which it is electrically connected.

Concentric with the axis of the ratchet and pointer is a segmental conducting-plate, G, in contact with which is a sleeve or slide, e, having capability of longitudinal movement on the pointer $E^2$, being provided with a hook, $e'$, on its outer extremity.

After passing through the electro-magnet F the current traverses an electro-magnet, H, which has a polarized lever-armature, h, as shown.

The polarization is preferably so arranged that the normal current causes the magnet to attract this armature, and the reverse current causes its repulsion. The lever-armature when in attracted position is made to contact at some point with the segment G, or with a metallic projection in electrical contact therewith.

From the conducting-post of armature h a wire descends to earth at central station. After having passed through the second electro-magnet H, the current proceeds by a direct connection with the segment G, whence, when the conducting armature-lever h is in attracted position it passes to earth.

By this arrangement a temporary circuit is secured for the proper manipulation of the already-described devices, and the revolving of the index at the local station will invariably effect an exactly coincident and synchronous rotation, step by step, of the pointer $E^2$ at the central office.

As stated, each of the lines converging to the central office has therein its own exclusive electro-magnets, ratchet, pointer, and segmental plates.

Figures 7, 8:
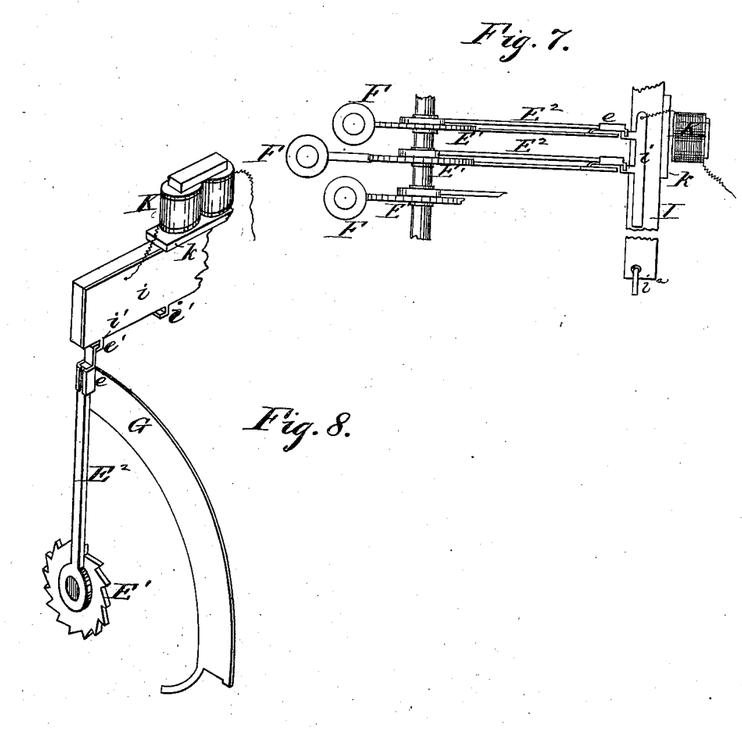
Fig. 7 is a partial side elevation of the apparatus shown in Fig. 2.
Fig. 8 is a perspective view of one of the suborganizations shown in Fig. 2.

I I are a series of bars, hung or suitably pivoted, or otherwise arranged, radially outside the segment G, and parallel with the common axis. Each bar I is long enough to reach from end to end of the series of segments G. These bars we prefer to make of one piece of non-conducting material, having a conducting-strip, i, on one side, as shown in Fig. 8. From the strip i, beyond the inner edge of the bar, project hooks $i'$ of metal, there being as many hooks on each bar as there are ratchets and pointers—i. e., one hook for each circuit which enters the central office—and these hooks are made to stand, normally, in such position that the hook $e'$ of the slide e on pointer $E^2$ will pass through, and in electrical contact with, hook $i'$ when the pointer is rotated.

The conducting-strip i of the bar I is connected to one of the terminals of an electro-magnet, K, suitably mounted, and having its poles facing a polarized armature, k, fixed to the bar I, the poles being so disposed that with the normal current repulsion takes place, but with a reverse current attraction is set up. After traversing the magnet K the current passes out of the machine to the line or circuit of another local station to which that particular bar I belongs.

The operations before described brought us to the point that the revolving of the dial-rheotome at first local station effected the revolution of the pointer $E^2$ at the central office, the circuit being complete through a ground at the central office. We now reverse the current without breaking it by means of a suitable key, which need not be herein particularly described, and at once effect several very remarkable results. First, the reversal of the current repels the armature h, and instantly cuts out the ground at central office from the line under manipulation. The current then passes into the segment G and out of it to the contacting-slide e from its hook $e'$ to the hook $i'$ of the conducting-strip i, since the two are in electrical contact, as before shown, having been brought thereto by the rotation of the pointer $E^2$ before the current was reversed. Thence the current passes to the line of the other local station, whence it returns by earth. Now, when the reversal takes place the magnet K has its poles changed, and it instantly attracts the polarized armature k, and this being fixed to the bar I, which is pivoted at $i^2$, (or otherwise arranged so as to be moved radially from the center,) pulls the latter out. The result is that the hooks $i'$ of bar I are now out of the path of the hooks of all other pointers, and consequently the circuit thus established between the two local stations is completely isolated, and the pointer of the central-office ratchet of no other local station can obtain a contact with said circuit. Hence absolute immunity against interruption, and all the annoyances of cutting in and cutting out, cross-talking, &c., is afforded, thus insuring the utmost privacy for the stations wishing to converse.

Though no other station can interfere in any way with the circuit of two which are in communication, any other two can obtain a circuit in the same manner. The ultimate result is that on exchange all the members may be talking at once, two and two, and no one will get messages intended for some one else.

A further result of the reversal of the current is the ringing of the call-bell at the local station belonging to the bar I with which the contact is secured, the bell being rung by a polarized armature, as before stated. Therefore, by the mere reversal of the current at the local station we obtain the threefold result, after making contact with the line of any other desired local station, of cutting out the ground-wire, completely isolating the line thus established, and ringing the call-bell of said other station.

In the described operations of reversing the current and restoring it to normal, the reversing-key would be, preferably, so constructed with overlapping terminals that in passing from normal to reversed position, or vice versa, no break will occur. We thus avoid the possibility of disturbing the contact secured at central office with other lines, and a consequent complication at the central office.

In cutting out the local battery and switching on the call-bell for the purpose of receiving the answering signal of the station just called the current leaves the line, and consequently, the electro-magnet which operates the ratchet at central station lets go of its armature, which is soft iron. Now, when the other station switches its battery into main line, it will be so adjusted by his reversing-key that the direction will be such as will not repel the polarized armatures of the central office, or affect them in any way; but in order to avoid the disconnection which would occur by this reverse current attracting the ratchet-actuating armature, we may make the contact-surface of the slide on the pointer broad enough to permit such single attraction and resultant step of the pointer to take place without breaking the contact; or we may so arrange the lever of the armature which cuts out the ground of the central station that in performing that function said armature causes a stop or dog to fall in the way of a projection on the ratchet, so that the armature cannot move till the person at the original station lets go of it by restoring his current to the line and bringing its direction to normal, when the following acts are instantaneously and simultaneously performed: First, the polarized armature $k$ is repelled by the magnet K, thus forcing the bar I back, and its hook $i$ pushes the slide on the pointer back to its normal position, where it is ready for use again; second, the polarized armature $h$ is attracted by magnet H, thus causing the central ground to be re-established, and restoring the temporary earth returns to allow the original station to connect to any other line desired.

While one local station is talking to another, it is very desirable that the two connected stations should be entirely isolated from all others.

The apparatus, as so far described, enables the isolation of the bar belonging to the station called; but it is also advisable to isolate the bar of the station calling. To effect this result we run a branch line from the line of the station calling, to a suitable terminal, $x$. Another line, $y$, is run from the conducting-strip on the bar of the station to the operative electro-magnet which draws said bar.

An insulated conducting-strip, $z$, or spring-plug, is fixed on the pointer belonging to the same station, and so arranged that when the pointer is at an initial point or zero on the segment the strip $z$ will be in contact with terminals $x$ and $y'$, and thus complete the branch circuit from the bar through the electro-magnet, through the branch line, till it meets the main line of that station it belongs to. By this means, when that station operates its dial-rheotome, its pointer at the central office moves from the initial point or zero, and the branch circuit is broken thereby. Now, if any other station than the one called wishes to connect onto the line of the station calling, there is nothing to prevent it operating its pointer till contact is made with the bar of the first station calling; but when that point is reached it cannot obtain a circuit at all through the line belonging to that bar, and hence cannot interrupt or in any way interfere with the conversation progressing between the two local stations already in circuit. This arrangement has also another advantage. If a local station is very busy, and, so to speak, "not at home" to any telephone on exchange, nothing need be done but to simply move the index of the dial a short distance from the zero or initial point thereon. Such arrangement would necessitate that each party, when done talking and after restoring positions at central office, should, before leaving his instrument, whirl round the index to its zero-point.

To sum up, then, the operations required are as follows: At the station desiring to call another station, operator whirls round his index till it arrives opposite the number of the station desired, reverses his key, and then sets his switch to the call-bell. As soon as the answering-signal is received he sets his switch to the third point, which shunts the local battery into the primary of the telephone and places the secondary in the main line. After he is done talking, he switches on the battery to the main line and places his reversing-key back to normal, which restores the central office to normal, and then he whirls his index around to zero and switches his bell into main.

At the station called, as soon as the bell rings the operator switches his battery into the line with its direction conforming to that required to preserve the armatures at central office in the positions set by station calling. This will at once ring the bell of the station calling, after which he switches his telephone secondary to the line and battery to the telephone. After the connection is finished he switches back to the bell simply.

Though we have specifically described apparatus at the central office capable of effecting the objects sought, we wish it to be clearly understood that we do not confine the scope of our invention to the mechanical arrangements set forth herein, as we believe ourselves to be the first to have invented an apparatus by which the present manual-labor system at the central office is supplanted by an automatic machine operated directly from the local stations by means of electro-magnetism.

We also believe ourselves to be the first to have invented a plan whereby, in a system of telephonic lines forming an exchange of three or more members, any member may place himself in private communication with any disengaged member without preventing or precluding the simultaneous intercommunication of the other.

The foregoing description illustrates our invention elaborated into that form which is of most general importance. It contains many features, however, which would not be required under simpler conditions. One such condition is fulfilled by the diagram, Fig. 6, where M represents, say, the main office of a manufacturing establishment having a line of relatively long extent running to some particular point—say, a sub-office at its factory—whence other shorter lines diverge to various departments of the works. The object is to permit the main office, with but a single apparatus, to so manipulate a device at the sub-office (which may be regarded as the central station of the system first described) as to obtain, at will, a connection with any of the sub-lines, which connection shall be entirely isolated and incapable of being in any manner interrupted, and no messages passing either way on the line can be heard by any other than the office intended.

Figure 6:
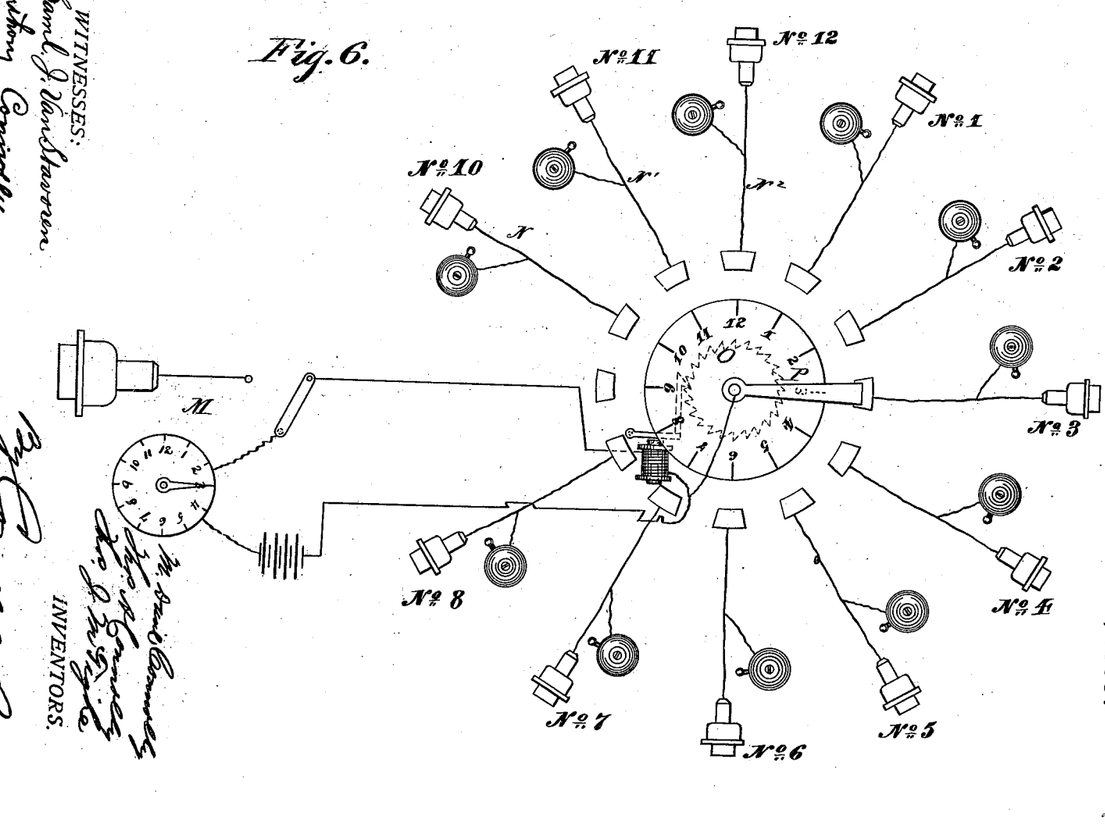
Fig. 6 is a diagram illustrating the relation of a series of independent telephonic lines to a central connecting device, and to a single principal station and circuit, from which connection may be established with any one of the other lines.

In the figure, M represents the main office, which is practically the same as one local station in the system first described. N, N', N², &c., are the short lines, terminating in a disk or segment, O, at the sub or central office, and over this travels a pointer, P, thus making the centralizing device practically the same as one pointer, segment, and magnets of the system referred to.

To obtain a circuit with a telephone in one department of the works the main-office index is rotated, thus bringing the main line around to the proper point, whereupon the ground is cut out and circuit completed as before. This done, the other sub-lines are incapable of use, their circuit being incomplete, and hence they are isolated.

In this simple application of our invention the current-reversing arrangement previously described may be dispensed with by the provision of two lines running from the main to the sub or central office, with a switch at the former, whereby, after circuit is established with the desired telephone, one of said lines may be cut out.

Under some conditions as to number of lines on exchange, it may be necessary to use, instead of the quadrantal or segmental contact-plate before described, an annular plate, around which a much larger number of bars may be arranged, forming the terminals of the respective lines.

To accommodate a still larger number of lines, the ratchet at the central may have an endless band passing over it and over a sprocket-wheel placed far enough away to permit the required number of terminal bars to be arranged alongside its path. This band may have an arm projecting from it similarly to the pointer before set forth, and a contact-plate in contact therewith equivalent to the segment or annulus above described. All the other devices would not be substantially changed.

Figures 1, 9:
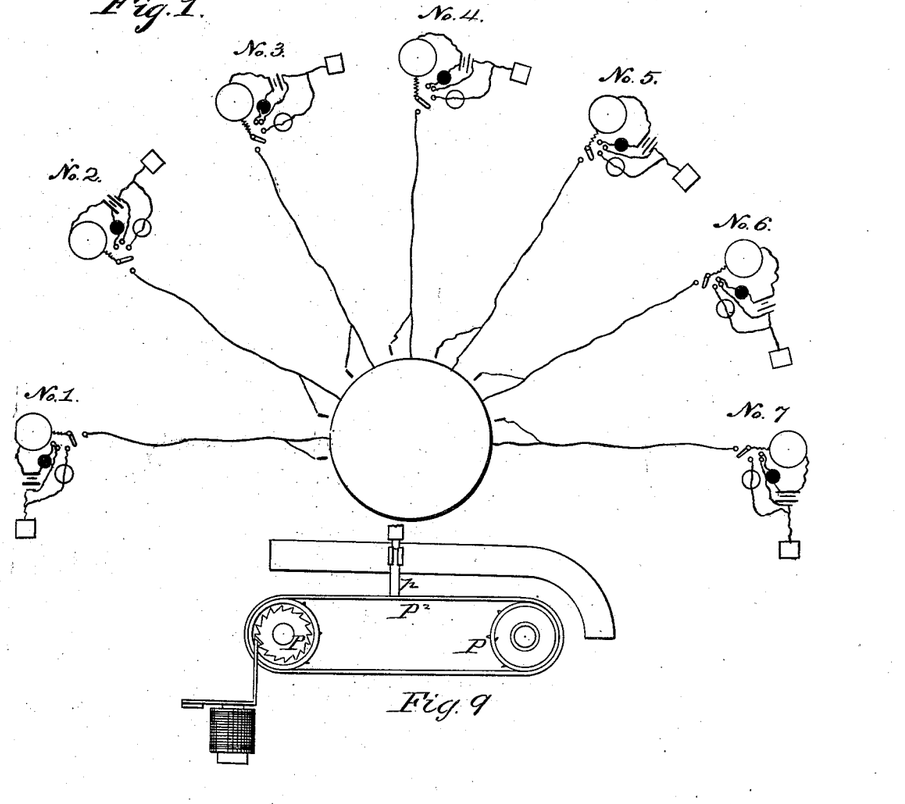
Figure 1 is a diagram illustrating the relations of a series of independent telephonic stations and lines to a central station, as embodied in our invention.
Fig. 9 is a plan or side view of a modification hereinafter described.
Figure 2:
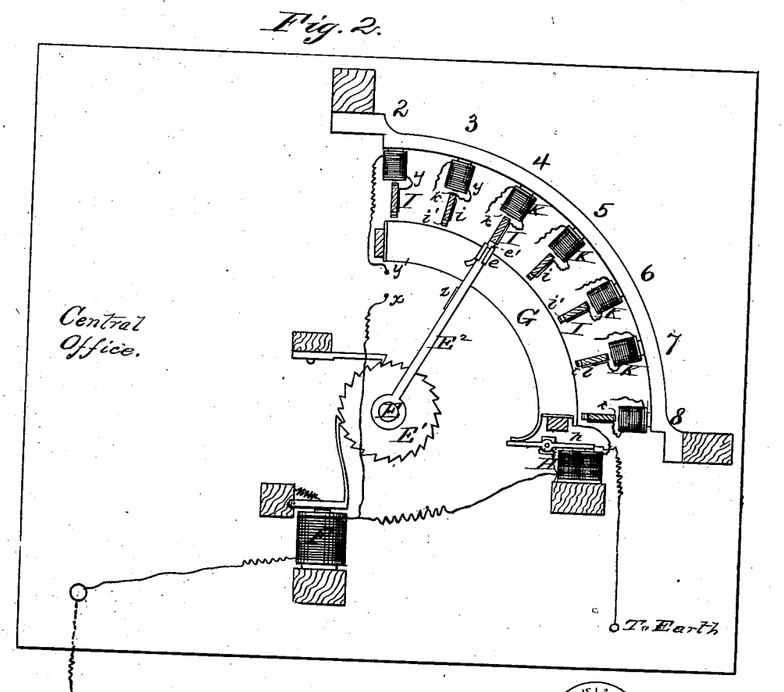
Fig. 2 is a plan view of an automatic connecting apparatus constructed in accordance with our invention.
Figure 3:
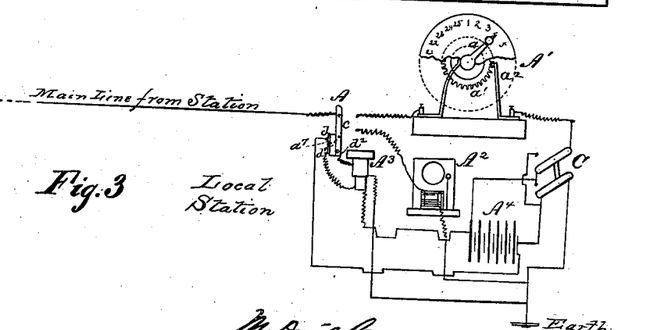
Fig. 3 is a diagram showing the arrangement of a local telephonic station with appurtenances.
Figure 4:
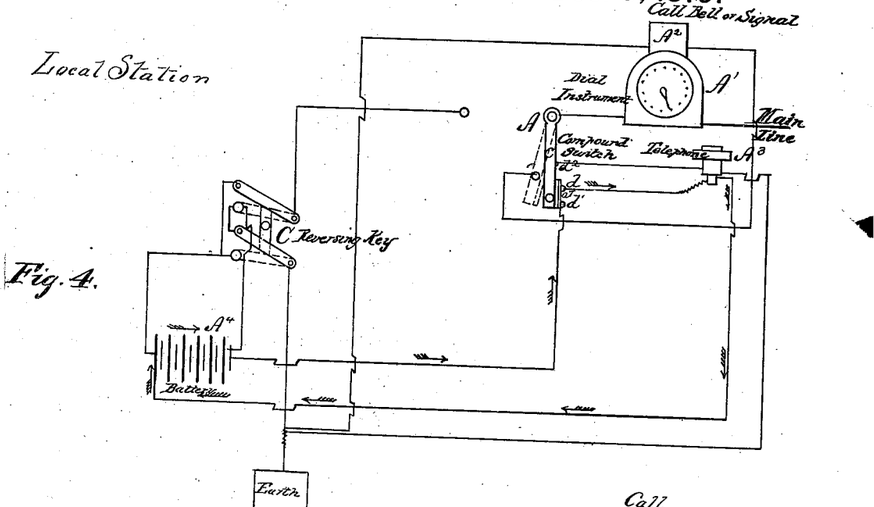
Figs. 4 and 5 are diagrams in further illustration of the local telephonic-station system, showing two stations under different aspects.
Figure 5:
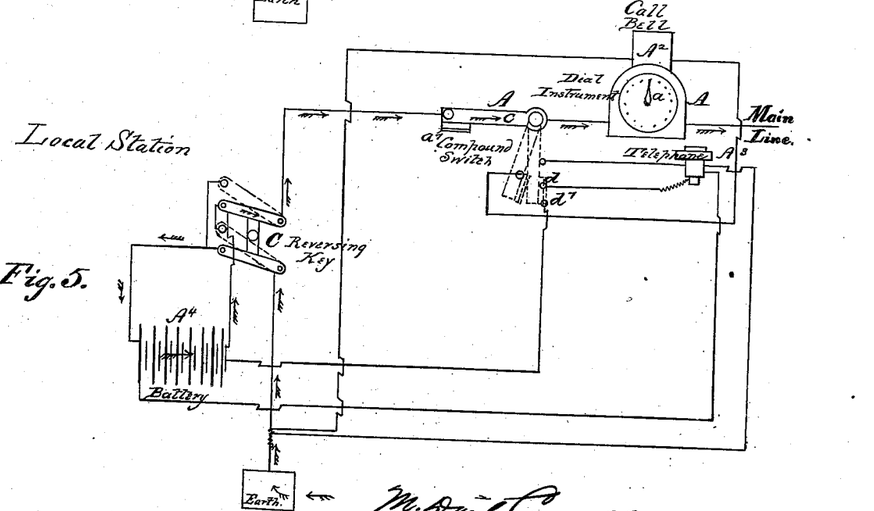

The arrangement just described is illustrated in Fig. 9, where P is the ratchet; P', a pulley; and P², a band passing over and actuated thereby, and carrying a pointer, p.

Where the telephonic-exchange system is applied to independent lines each embracing several stations, the apparatus embodying our invention may be employed for automatically connecting the different lines in pairs.

What we claim as our invention is as follows:

1. An automatic telephone-exchange or series of independent stations having means of electrical communication with each other, and combined with mechanism controlled from the different stations and adapted to automatically establish communication between any disengaged pair at any and all times, while securing individual privacy between each pair.

2. An automatic telephone-exchange comprising a series of three or more converging independent lines and a central connecting apparatus, so constructed and arranged that any member of the exchange may, while others are engaged, and from his own individual station, place himself in direct communication with any disengaged member of the exchange.

3. A coupling or connecting instrument for converging telephone-lines operated automatically by currents controlled from distant stations, and provided with devices whereby any two independent lines may be directly and immediately coupled or connected, to the exclusion of all others from the same circuit, while permitting the establishment of separate circuits between the lines so excluded.

4. An electro-automatic central for telephone-exchanges provided with a step-by-step action or progressive movement for establishing the coincidence of selected lines, and a shifting conductor, by which coinciding lines may be isolated or rendered independent of others in the exchange, and means for permitting the free intercommunication of the latter.

5. A series of independent telephonic lines converging to a central office or intermediate station, in combination with a connecting mechanism located at the point of convergence, and capable of being automatically so manipulated through such lines that any one of said lines may at all turns at will be placed in electric circuit with any other disengaged circuit of the series.

6. A series of independent telephonic lines converging to a central office or intermediate station, in combination with a connecting mechanism located at the point of convergence, and capable of being automatically so manipulated through such lines that all or any number of said lines may be placed in electrical circuit in pairs at the same time.

7. In a telephonic exchange system consisting of a number of circuits converging from distant stations to a central office, an instrument located in the central office containing electro-mechanical devices, placed, respectively, in said converging circuits, adapted to connect any or all of said circuits simultaneously in mutual contact in pairs, and suitable means at each of the stations for putting said electro-mechanical devices in operation.

8. The method of perfecting interconnection of independent lines in a system of telephonic circuits in which each line is dependent upon a single circuit, by the operations of the normal and reversed currents from local batteries, the normal current being employed to bring the two lines into contact, and the reversed current to isolate the circuit so established from all others of the system.

9. The method of restoring the normal relations of two connected lines in a system of telephonic circuits which have been electrically connected by reversing the current, consisting in restoring the current to its normal direction, and thus causing the electro-mechanical connecting devices to resume their original position, whereby the connection is severed and the two lines are brought to their normal condition.

10. In a system of independent telephonic circuits converging to a central office, the method of securing privacy between any two communicating stations with reference to all other lines, consisting in removing or disconnecting by means of an electrical current controlled at either of said stations any or all of the devices through which any other station could communicate therewith.

11. In a system of telephonic circuits converging to a central office, a movable electro-magnetic switching device forming the terminal of a given line, in combination with a series of conductors respectively forming the terminals of the other lines of said system, a step-by-step action for effecting coincidence of lines, a make-and-break mechanism at the distant station of the given line, and an electric generator, whereby the successive pulsations produced in the given line effect the progressive contact of said device with the other terminals.

12. In a device for establishing intercommunication between separate and independent lines of a system of telephonic circuits, the combination, with a traveling pointer whose movements are responsive to the intermissions of a distantly-controlled rheotome, and which forms a medium of communication between a given line and a line selected from the others of the system, of a conductor in constant contact with said pointer, a ground and an automatic switch which alternately shunts the current of the operative line directly to earth and through said conductor to the line brought into connection therewith.

In testimony that we claim the foregoing we have hereunto set our hands this 6th day of September, 1879.

M. DANL. CONNOLLY.
THOMAS A. CONNOLLY.
THOMAS J. McTIGHE.

Witnesses:
K. McTIGHE,
A. McTIGHE.